(12) United States Patent
Ganesh et al.

(10) Patent No.: US 11,656,924 B2
(45) Date of Patent: May 23, 2023

(54) SYSTEM AND METHOD FOR DYNAMIC VOLUME MANAGEMENT

(71) Applicant: Samsung Electronics Co., Ltd., Suwon-si (KR)

(72) Inventors: Guruprasad Ganesh, Santa Clara, CA (US); Ahmed M. Azab, Palo Alto, CA (US); Rohan Bhutkar, San Jose, CA (US); Haining Chen, Santa Clara, CA (US); Ruowen Wang, San Jose, CA (US); Xun Chen, Fremont, CA (US); Donguk Seo, Suwon-si (KR); Kyoung-Joong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 275 days.

(21) Appl. No.: 16/524,771

(22) Filed: Jul. 29, 2019

(65) Prior Publication Data

US 2020/0042366 A1 Feb. 6, 2020

Related U.S. Application Data

(60) Provisional application No. 62/714,571, filed on Aug. 3, 2018.

(51) Int. Cl.
| | | |
|---|---|---|
| G06F 15/02 | (2006.01) | |
| G06F 9/54 | (2006.01) | |
| G06F 21/62 | (2013.01) | |
| H04L 67/00 | (2022.01) | |
| G06F 9/455 | (2018.01) | |

(52) U.S. Cl.
CPC .......... *G06F 9/545* (2013.01); *G06F 9/45545* (2013.01); *G06F 21/6218* (2013.01); *H04L 67/34* (2013.01)

(58) Field of Classification Search
CPC .. G06F 9/545; G06F 9/45545; G06F 21/6218; H04L 67/34
See application file for complete search history.

(56) References Cited

U.S. PATENT DOCUMENTS

| | | |
|---|---|---|
| 7,424,637 B1 | 9/2008 | Schoenthal et al. |
| 9,448,786 B1 | 9/2016 | Emelyanov et al. |
| 9,760,394 B2 | 9/2017 | Liguori et al. |
| 9,851,991 B2 | 12/2017 | Russinovich et al. |

(Continued)

FOREIGN PATENT DOCUMENTS

| | | |
|---|---|---|
| KR | 20070088887 A | 8/2007 |
| KR | 10-2018-0019674 A | 2/2018 |

OTHER PUBLICATIONS

International Search Report dated Nov. 27, 2019 in connection with International Patent Application No. PCT/KR2019/009684, 3 pages.

(Continued)

*Primary Examiner* — Timothy A Mudrick
*Assistant Examiner* — Abdou K Seye (57) ABSTRACT

An electronic device includes a memory and at least one processor coupled to the memory. The at least one processor is configured to identify a device change event in a host operating system, wherein the host operating system includes a host namespace, switch from the host namespace to a container namespace of a container, and update the container with information based on the device change event.

20 Claims, 5 Drawing Sheets

(56) References Cited

U.S. PATENT DOCUMENTS

| | | | |
|---|---|---|---|
| 9,886,265 | B2 | 2/2018 | Coffing et al. |
| 10,025,924 | B1 | 7/2018 | Vagin et al. |
| 10,067,941 | B2 | 9/2018 | Buban et al. |
| 10,275,362 | B2 | 4/2019 | Garibay et al. |
| 2013/0073519 | A1 | 3/2013 | Lewis et al. |
| 2016/0342411 | A1* | 11/2016 | Cooper ............... G06F 8/65 |
| 2016/0373327 | A1 | 12/2016 | Degioanni et al. |
| 2017/0039242 | A1 | 2/2017 | Milton et al. |
| 2017/0090960 | A1 | 3/2017 | Anderson et al. |
| 2017/0093921 | A1 | 3/2017 | Duan |
| 2017/0357657 | A1 | 12/2017 | Garvey et al. |
| 2017/0366616 | A1* | 12/2017 | Rodrigues Nascimento ............... H04W 4/44 |
| 2017/0371693 | A1 | 12/2017 | Corrie et al. |
| 2018/0004570 | A1* | 1/2018 | Maupu ............... G06F 9/5038 |
| 2018/0032258 | A1 | 2/2018 | Edwards et al. |
| 2018/0074839 | A1* | 3/2018 | Pachlore ............. G06F 9/45558 |
| 2018/0139238 | A1* | 5/2018 | Schultz ............... H04L 63/1491 |
| 2018/0227369 | A1* | 8/2018 | DuCray ............... G16H 40/20 |
| 2018/0314821 | A1* | 11/2018 | Brady ............... G06F 9/45558 |
| 2018/0336351 | A1* | 11/2018 | Jeffries ............... G06F 21/577 |
| 2019/0108116 | A1* | 4/2019 | Benes ............... G06F 11/3664 |

OTHER PUBLICATIONS https://jpetazzo.github.io/2015/01/13/docker-mount-dynamic-volumes/ "Attach a volume to a container while it is running" 5 pgs. Aug. 13, 2018.

\* cited by examiner

CONTAINER DEVICE ACCESS CONTROL LIST — 300

302

| Container 1 | | Container 2 | | |
|---|---|---|---|---|
| Priority Level: 1 | | Priority Level: 3 | | |
| Device Class | Container Access | Device Class | Container Access | |
| Hard Drive | Permit | Hard Drive | Permit | |
| USB Drive | Deny | USB Drive | Permit | |
| Keyboard | Permit | Keyboard | Permit | |
| Mouse | Permit | Mouse | Permit | |
| Speaker | Permit | Speaker | Deny | |
| Microphone | Permit | Microphone | Deny | |
| Camera | Deny | Camera | Permit | |
| Joystick | Deny | Joystick | Deny | |
| Printer | Permit | Printer | Deny | |
| Wi-Fi | Permit | Wi-Fi | Deny | |
| ... | ... | ... | ... | ... |

SYSTEM AND METHOD FOR DYNAMIC VOLUME MANAGEMENT

CROSS-REFERENCE TO RELATED APPLICATION AND CLAIM OF PRIORITY

This application claims priority under 35 U.S.C. § 119(e) to U.S. Provisional Patent Application No. 62/714,571, filed on Aug. 3, 2018, and entitled "System and Method for Dynamic Volume Management." This provisional patent application is hereby incorporated by reference in its entirety.

TECHNICAL FIELD

This disclosure relates generally to implementing guest environments on a computing platform. More specifically, this disclosure relates to a system and method for dynamic volume management.

BACKGROUND

Applications are often dependent on specific libraries, dependencies, and files, and thus are not always portable to different systems that do not contain the specific libraries, dependencies, and files for the application to run properly. Containers provide a set of one or more processes that are isolated from the rest of a system. All the files necessary to run containers are provided from a distinct image, meaning that containers are portable and consistent between different systems. The contents of a container can also be considered an installation of an operating system because the container comes complete with application installation packages, configuration files, and other components for running an operating system. Containers therefore allow for running multiple, isolated, operating systems on a single system.

Containers can share the same operating system kernel and isolate the application processes from the rest of the system. Containers revolutionize how applications are developed, deployed, and managed, and provide portability and version control, helping to ensure that an application that works during development also works for end users. Compared to virtual machines, containers are less resource intensive, have a standard interface (start, stop, environment variables, etc.), retain application isolation, and are more easily managed as part of a larger application (multiple containers).

In existing situations where external volumes, or other devices such as input/output devices, are used in computing systems, the computing systems have one or more interfaces such as a universal serial bus (USB) interface for external wired communication. These interfaces are used for variety of purposes, such as connecting external storage devices or other device such as input/output devices. Examples include digital (SD) cards, USB drives, keyboards, audio device such as speakers and microphones, or other devices. The computing devices can add and remove these devices, with the change immediately shown in applications. The computing devices do not have to be restarted for the change to take effect.

Present implementations of containers, however, cannot be modified at run time; container configuration is done before launch time. The addition or removal of volumes (e.g., USB storage, etc.), or other devices such as input/output devices, requires restarting the container, which can interrupt processes in or cause progress or data to be lost.

SUMMARY

This disclosure provides a system and method for dynamic volume management.

In a first embodiment, an electronic device includes a memory and at least one processor coupled to the memory. The at least one processor is configured to identify a device change event in a host operating system, wherein the host operating system includes a host namespace. The at least one processor is further configured to switch from the host namespace to a container namespace of a container. The at least one processor is further configured to update the container with information based on the device change event.

In a second embodiment, a method for dynamic device management includes identifying a device change event in a host operating system, wherein the host operating system includes a host namespace. The method further includes switching from the host namespace to a container namespace of a container. The method further includes updating the container with information based on the device change event.

In a third embodiment, a non-transitory computer readable medium embodies a computer program for operating an electronic device including a memory and at least one processor. The computer program includes computer readable instructions that, when executed by the at least one processor, cause the electronic device to identify a device change event in a host operating system, wherein the host operating system includes a host namespace. The computer program further includes computer readable instructions that, when executed by the at least one processor, cause the electronic device to switch from the host namespace to a container namespace of a container. The computer program further includes computer readable instructions that, when executed by the at least one processor, cause the electronic device to update the container with information based on the device change event.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HIVID), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 5, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure.

Figure 1:
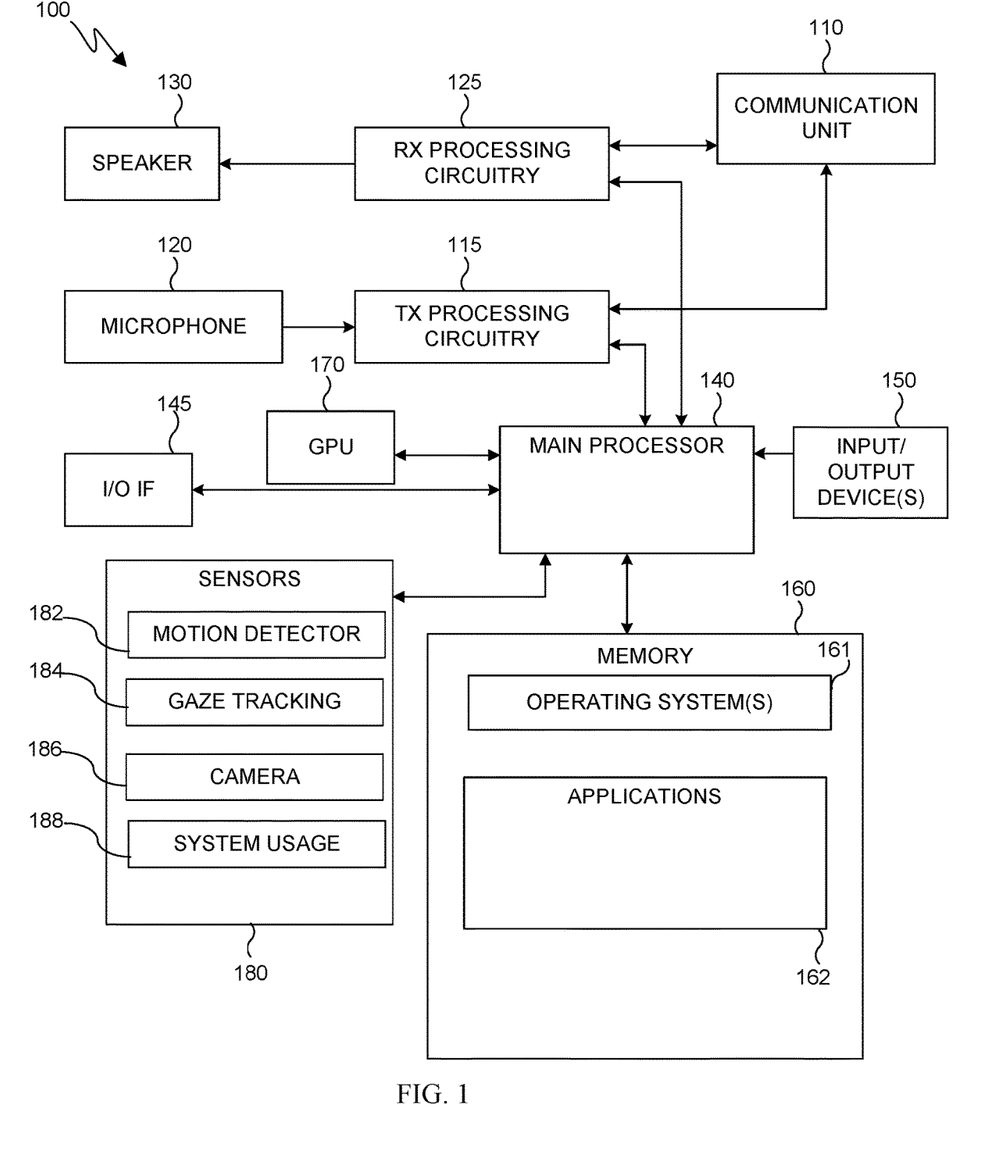
FIG. 1 illustrates an example of a device for providing data between a guest and a host environment according to embodiments of this disclosure.

FIG. 1 illustrates an example of a device 100 for providing data between a guest and a host environment according to embodiments of this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in FIG. 1, the device 100 includes a communication unit 110 that may include, for example, a radio frequency (RF) transceiver, a Bluetooth® transceiver, or a Wi-Fi® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes a plurality of operating system (OS) programs 161 and one or more applications 162. According to certain embodiments, the plurality of OS programs 161 includes a host, or default operating system, as well as one or more guest operating systems which can be implemented on one or more containers provided by the device 100.

The applications 162 can include legacy applications, or applications developed for, and having application logic tied to, host or guest operating system programs on device 100. The applications 162 can be configured to control container hardware device access and update procedures as disclosed herein. For example, the applications 162 can be configured to respond to a device change event by determining whether a container is allowed to access a device associated with the device change event, retrieve device information associated with the device or a type of device, enter a namespace of the container, and create, enable, remove, or disable device access points in the container associated with the device, update processes within the container with information associated with the device, and revert back to a namespace of a host.

The communication unit 110 may receive an incoming RF signal such as a Bluetooth® or Wi-Fi® signal. The communication unit 110 may down-convert the incoming RF signal to generate an intermediate frequency (IF) or baseband signal. The IF or baseband signal is sent to the RX processing circuitry 125, which generates a processed baseband signal by filtering, decoding, and/or digitizing the baseband signal or IF signal. The RX processing circuitry 125 transmits the processed baseband signal to the speaker 130 (such as for voice data) or to the main processor 140 for further processing (such as for web browsing data, online gameplay data, notification data, or other message data).

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, and/or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the basic OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as used by an executing process. In some embodiments, the main processor 140 is configured to execute the applications 162 based on the OS program 161 or in response to inputs from a user, sensors 180 or the applications 162. The applications 162 can include applications specifically developed for the platform of the device 100, or legacy applications developed for earlier platforms. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device. Input/output device(s) 150 are, according to certain embodiments, associated with one or more of the sensor(s) 180 to provide input to main processor 140.

Input/output device(s) 150 can include one or more screens, which can be a liquid crystal display, light-emitting diode (LED) display, an optical LED (OLED), an active matrix OLED (AMOLED), or other screens capable of rendering graphics. The one or more screens can include a plurality of display elements, such as electronically modulated light emitting diodes, that define a physical, or native resolution of a screen comprising input/output device(s) 150. For example, a WQHD display can have a physical resolution of 2560×1440 pixels. Additionally, screens can include a touchscreen capable of registering tactile inputs correlating with pixels of the screen and/or regions of the screen.

The main processor 140 can be configured to perform operations according to control logic provided by basic operating system 161, applications 162 and/or other executable program code stored in memory 160. The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

The sensors 180 can comprise a variety of sensors for generating inputs processed by device 100, and include without limitation, accelerometers, digital cameras, touch sensors, digital thermometers, pressure sensors and global positioning system sensors. For example, the sensors 180 can include a motion detector 182. The motion detector 182 can be an optical sensor, an accelerometer or a gyroscopic sensor. Additionally, the motion detector 182 can comprise multiple motion detectors, such as motion detectors coupled to a user's head and/or limbs. Additionally, sensors 184 may include cameras and other sensors 184 suitable for performing gaze tracking of a user's eyes, to detect which portions of the screen a user's gaze is focused upon. Sensors 180 can include additional cameras 186, including cameras disposed on the back side of screen, including sensors for providing an augmented reality (AR) experience, in which digital images are superimposed over the view of a camera positioned on or near a user's eye. Further, sensors 180 can include sensors 188 configured to monitor the usage of system resources, including, without limitation, the main processor 140, the GPU 170 and/or the memory 160.

Although FIG. 1 illustrates one example of a device 100 for providing data between a guest and a host environment according to embodiments of this disclosure, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
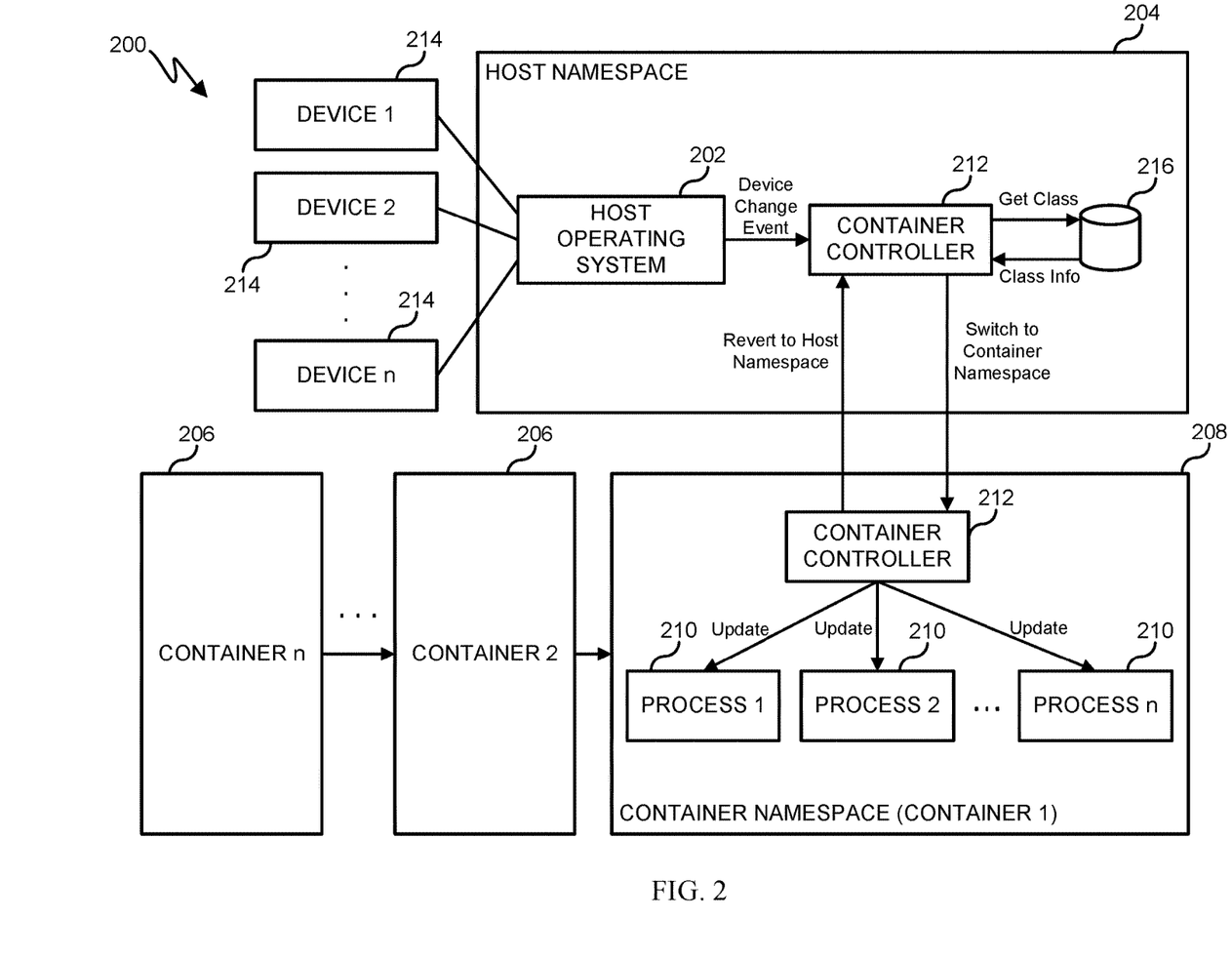
FIG. 2 illustrates an example of an architecture for providing device updates to containers according to embodiments of this disclosure.

FIG. 2 illustrates an example of an architecture 200 for providing device updates to containers according to embodiments of this disclosure. The architecture 200 and the components of the architecture 200 can be executed on a device, such as device 100, and/or by a processor, such as processor 140. The architecture 200 includes a host operating system 202 including a parent or host namespace 204. The host operating system 202 can execute any number of containers 206. The containers 206 each include a separate child or container namespace 208 wherein one or more container applications or container processes 210 can be executed.

The containers 206 can include libraries, dependencies, files, and other components that allow for the container and the one or more container processes 210 to run independently from the host operating system 202 and the host namespace 204, such that the containers 206 and the container namespaces 208 provide a separate and distinct operating space from the host and from each other container. The containers 206 can further include components such as program installation packages, such as Red Hat Package (RPM) files, configuration files, and other components for running a guest operating system in the container namespace 208. The host operating system 202 and the guest operating system can run concurrently, to provide programs and other functionality of multiple operating systems to a device such as the device 100. Example host and guest operating systems can include various Linux distributions, various versions of MICROSOFT WINDOWS, various versions of OSX, various mobile device-based operating systems such as iOS and ANDROID, and other operating systems. In some embodiments, the host namespace 204 and the container namespace 208 may be based on the same OS, with the two namespaces providing isolated or "jailed" instances of the operating system. In some embodiments, more than one guest operating system and guest operating space can be executed in the architecture 200. In some embodiments, one or more applications in the host namespace 204 can execute and manage the container, such as a container controller 212, and system resources can be allocated by the kernel to the one or more applications that execute and manage the container in order to distribute resources between the container and applications and processes running in the host namespace 204. The architecture 200 can be used in the context of a single instance of the kernel and multiple instances of user spaces, and is not bound to a specific kernel or specific host or guest system. The architecture 200 can be applied to a broad spectrum of computing systems.

The host operating system 202 can have connected thereto one or more devices 214. The devices 214 can include any device that can be connected to a computer system, such as hard disk drives and solid state or flash memory drives, including internal drives connected via SATA cables or other types of connectors and external drives such as USB drives. The devices 214 can also include wired or wireless input/output devices such as a keyboard, a mouse, speakers, a microphone, a joystick, audio players, or other devices. The devices 214 can also include devices such as cameras, printers, networking devices such as Wi-Fi, Bluetooth, Ethernet interfaces, infrared devices, near-field communication (NFC) devices, or other devices.

During operation, devices 214 can be added for use by the host operating system 202, such as by connecting a device 214 to the device 100, and the host operating system 202 can perform operations, such as a plug and play (PnP) operation, to add the device 214 to the system and enable applications to use the device 214. A PnP operation performed by the host operating system 202 can include various steps to add the device 214 to the host system, such as hardware interrupt requests, direct memory access to configure the device 214 to access system memory, assigning a section of system memory for exclusive use by the added device 214, input/output configuration, such as defining ports used by the device for receiving and sending information, and retrieval and installation of device drivers. During operation, devices 214 can also be removed from the device 100, causing the host operating system 202 to perform cleanup operations to remove the device 214, such as deallocating memory, unassigning ports for use by other devices, or other operations.

Existing implementations of containers do not provide for modification of containers at run time, such as adding or removing available devices. All configurations for the container are implemented before run time, such as in a JavaScript Object Notation (JSON) configuration file, to build an image for the container using currently connected devices. For example, when a container is launched with a single storage device, an image for the container is built using the single, currently-available, storage device. Then when another storage device is inserted in interfaces like a universal serial bus (USB), the container has to be restarted and/or reconfigured, in order for the change to be effective.

The architecture 200 provides for updating device access for a container at run time. The container controller 212 performs container updates to notify and configure containers at run time of added or removed devices. The container controller 212 can be a high-privileged application, such as an application 162, executed by the host operating system 202 in the host namespace 204. In some embodiments, the container controller 212 can be an application that executes the containers 206, providing a view into the operating system and of the applications provided by the containers 206. In some embodiments, the container controller 212 can be a separate application for managing and configuring containers based on device change events.

As illustrated in FIG. 2, when a device 214 is added or removed, the host operating system 202 provides a device change event notification to the container controller 212. The device change event notification can include various information, such as the type of device added or removed. The container controller 212 accesses a database 216 that includes information on device types and information on the containers 206. Each device type can have an associated device class stored in the database. The container controller 212 retrieves the device class and its associated information from the database 216 to use that information in configuring the containers 206. Information associated with a class can include device setup profiles for setting up devices in the containers 206, information pertaining to containers 206 that are allowed to use the devices, or other information. Device setup profiles can, in some embodiments, provide information such as device nodes to be setup in a container for a device, how to allocate memory to the device, or other information for performing setup procedures akin to a PnP operation.

For example, in some embodiments, when a storage device, or a volume, such as a hard disk, a USB drive, or other storage device, is connected to the electronic device, the container controller 212 can retrieve from the database 216 information indicating that the device type is a storage device. A device setup profile for the storage device can include parameters for setting up the storage device in the containers. In some embodiments, the setup profile indicates that the container controller 212 is prohibited from mapping the entire volume in the containers, as this can present security risks to the host side because mapping the entire volume would give the container access to all data on the storage device, such as data used by the host operating system that is not used in the normal operation of the container processes. For example, the host operating system can use different directories for storing files of different types, such as videos, music, pictures, or other types. The host operating system can also store app specific data in specific application data directories. Relevant applications are allowed access to the data in these directions, while non-relevant applications can be prevented from accessing the directories. In some embodiments, non-relevant applications can go through framework level access control modules to access to the data in some circumstances.

In some embodiments of the present disclosure, to prevent unauthorized access of containers processes to the entire storage device, the container controller 212 creates a specific shared directory that is mapped within the relevant containers. In some embodiments, changes made inside this directory are visible by both the host side and the container side. Certain permissions used by the host operating system to access the shared directory can be granted during container application initialization or launch time, or configured by the container controller 212 at run time in response to a device event, and these permissions are explicitly mapped inside the container. This allows for all the tasks inside the container to access/modify content of this special shared directory, while preventing access to the entire volume. The tasks inside the container are prevented from access files or directories in the volume, unless the tasks possess the relevant permissions, such as permissions allowing access to at least a portion of the shared directory. The shared directory provides a security guarantee from the host operating system that container processes cannot breach or circumvent normal operation of the host operating system.

For example, the container controller 212 can retrieve from the database 216 at least one access control list (ACL) that provides which containers 206 can use which device classes, and, in some embodiments, provides an update priority for the containers 206. In some embodiments, the ACL can be stored elsewhere, such as in memory in association with the container controller 212, in a system file, or in specific containers 206 that provide the ACL to the container controller 212 to inform the container controller 212 of the permissions configured for the specific containers 206. In some embodiments, to provide additional security, certain containers 206 can be denied access to certain device classes so that container processes 210 in those containers 206 are prevented from taking over devices being used by other containers 206 or the host operating system 202, or to avoid using computational resources to configure containers 206 that do not use the device. For example, a container 206 can include container processes 210 that have specific functions that use specific devices, and devices other than those specific devices can be restricted. For example, if a particular container 206 includes container processes 210 that are configured to provide audio recording and playback functionality, the particular container 206, as defined by the ACL, may be denied access to other devices such as cameras, printers, etc., as those devices are not used for audio recording and playback. In some embodiments, device access in the ACL can be preconfigured for each container 206. In some embodiments, device access in the ACL can be changed based on events such as a user-provided access permission. For example, a notification could be provided on a screen of the device 100 asking a user to either grant or deny device access to a specific process executed by a container 206.

Once the container controller 212 retrieves the device class information and the device ACL from the database 216, the container controller updates the configuration of relevant containers 206 to add device access to, or remove device access from, the relevant containers 206. The relevant containers 206 are those containers 206 that are permitted to access the device class, as defined in the ACL, or are the containers 206 that are known to currently be using a device that is to be removed. The container controller 212 can also prioritize containers to determine an order in which the relevant containers 206 are to be updated. The prioritization of containers for updating can be based on a priority level or attribute in the ACL associated with each container.

As illustrated in FIG. 2, to update and/or reconfigure a container 206, the container controller 212 switches to the container namespace 208 for the particular container 206 to be updated, such as by using a command to enter the container namespace 208, wherein the command can be a custom command used by the container controller 212, or can be a command native to the container namespace 208. Once the container controller 212 enters the container namespace 208, the container controller 212 updates and/or reconfigures the container 206 from within the container namespace 208.

To add device access to a container 206, the container controller 212 creates at least one access point, such as a device node, for the corresponding device, and mounts or adds the access point in the container 206. If a device manager exists in the operating system or environment of the container 206, such as a storage or volume manager or other type of device manager, the container controller 212 notifies the device manager of the added device, and the device manager then provides access to the access point to the container processes 210 in the container 206. If the container 206 does not include a device manager, the container controller 212 can broadcast a notification concerning the added device to each of the container processes 210. The container controller 212 then reverts back to the host namespace 204. The container controller 212 can then enter the namespace of another container 206 to update the other container 206 with the device information. In some embodiments, the process of adding a device can also be performed when a device is enabled, or when access to a device is granted. For example, a device physically connected to the system can be switched from a disabled state to an enabled state, triggering the host operating system 202 to send a device change event to the container controller 212 to grant access to the enabled device to relevant containers 206. The container controller 212 can also perform the update process to add device access when a container is granted permission to access a device type, such as by a user settings selection or otherwise by the system.

To remove device access from a container 206, once the container controller 212 enters the container namespace 208, the container controller 212 signals to a device manager in the container 206 to perform clean up operations, and the container controller 212 waits for a response from the device manager. Device manager cleanup operations can include deallocating memory for devices, messages to applications currently using the devices to cease operations that use the device, or other operations. If the container 206 does not include a device manager, the container controller in some embodiments can broadcast a notification regarding the device removal to each of the container processes 210. After cleanup operations, the container controller unmounts or removes any access points for the device from the container 206. In some embodiments, the container controller 212 notifies the device manager of the removal of the access points, or can broadcast a notification of the removal of the access points to each of the container processes 210. The container controller 212 then reverts back to the host namespace 204. In some embodiments, the process of removing a device can also be performed when a device is disabled, or when access to a device is withdrawn. For example, a device physically connected to the system can be switched from an enabled state to a disabled state, triggering the host operating system 202 to send a device change event to the container controller 212 to remove access to the disabled device from relevant containers 206. The container controller 212 can also perform the update process to remove device access when device access permissions are withdrawn from a container, such as by a user settings selection, or otherwise by the system.

Although FIG. 2 illustrates one example of an architecture 200 for providing device updates to containers according to embodiments of this disclosure, various changes may be made to the example of FIG. 2. For example, the architecture 200 could include any number of components in any suitable arrangement. In general, computing systems and software architecture can come in a wide variety of configurations, and FIG. 2 does not limit the scope of this disclosure to any particular configuration. While FIG. 2 illustrates one architecture in which various features disclosed in this patent document can be used, these features could be used in any other suitable system or architecture.

Figure 3:
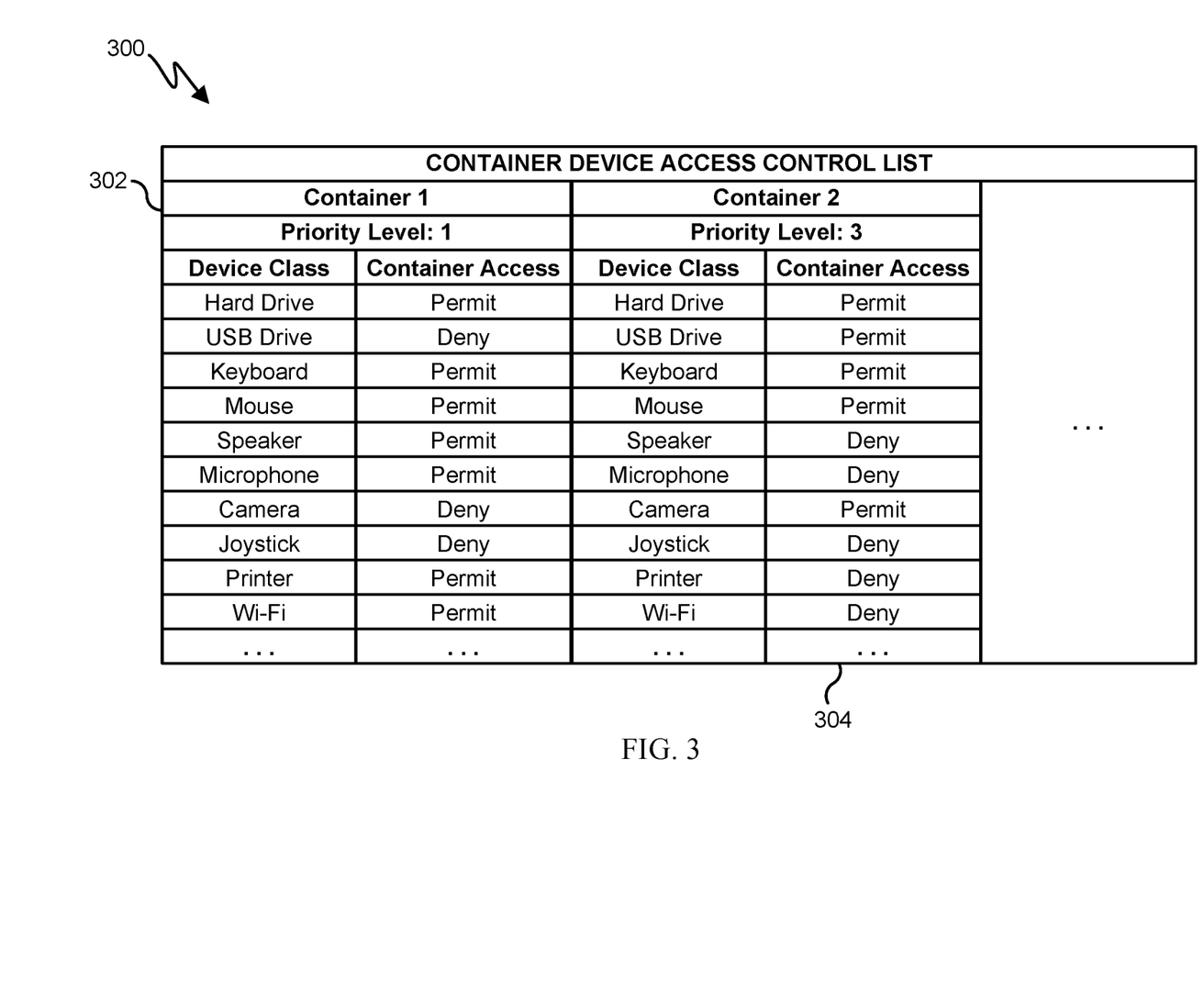
FIG. 3 illustrates an example device access control list (ACL) according to embodiments of this disclosure.

FIG. 3 illustrates an example device ACL 300 according to embodiments of this disclosure. It will be understood that the device ACL 300 is a representation of the types of information that can be included in an ACL. The ACL can be in other formats such as a device ACL system file, in an operating system registry, as database information, or in other formats. The device ACL can be used by the device 100 and the architecture 200 to determine which containers are allowed access to which device classes, which containers have update priority over other containers, or other information.

The device ACL 300 includes information associated with one or more containers. Each container can have an assigned priority level. For example, as illustrated in FIG. 3, the ACL 300 can include information 302 on a first container, and information 304 on a second container. The information 302 for the first container includes that the first container has a priority level of "1" and the information 304 for the second container has a priority level of "3." In this example, the first container has priority over the second container because the first container has a higher priority value than the second container. It will be understood that different ways of noting priority other than numerical values can be used, such as alphabetical ("A", "B", "C", etc.), priority names or classes, or other ways of noting priority for the containers. The information 302 and the information 304 further show that the first and second containers can be permitted or denied access to particular classes of devices. The device classes can be associated with devices such as hard disk drives and solid state or flash memory drives, including internal drives connected via SATA cables or other types of connectors and external drives such as USB drives, wired or wireless input/output devices such as a keyboard, a mouse, speakers, a microphone, a joystick, audio players, cameras, printers, networking devices such as Wi-Fi, Bluetooth, Ethernet interfaces, infrared devices, NFC devices, or other devices.

When the container controller 212 receives a device change event notification, the container controller 212 reads the device ACL 300 to determine which containers are relevant. For example, if the device change event and/or the retrieved device class indicates that a hard drive was added to the system, the container controller, using the example device ACL 300 in FIG. 3, would determine that the first container, the second container, and any other containers that are permitted to access hard drives, are relevant containers for the update process. As another example, if the device to be added is of a speaker class, the first container in the device ACL 300 would be a relevant container to update, while the second container would not be a relevant container. Once the container controller 212 determines which containers are relevant containers, the container controller 212 loops through each container in the order of priority to update each container with the new device. In some embodiments, a container listed in the device ACL 300 can have the same priority as another container. In such embodiments, the container controller 212 can group the containers by priority number and loop through each group based on priority, such as looping through each container in priority group 1, then each container in priority group 2, and so on.

The device ACL 300 can also be used when device access is to be removed from a container. The container controller 212 can refer to the device ACL 300 to determine which containers were granted access to a device based on which device classes are listed as being permitted for the containers. For example, if access to a USB drive is to be removed, the container controller 212 can, using the example device ACL 300, determine that the second container needs to be updated, since the second container is permitted USB drive access, while the first container is not to be updated. In some embodiments, for device access removal, the container controller 212 can keep a record, such as in memory, in a file, or in the database 216, of which containers have previously been granted access for a device, and then removes the device access for those containers when the device is removed, disabled, or a user or the system otherwise provides instruction that one or more containers are to be denied access to the device.

Figure 4:
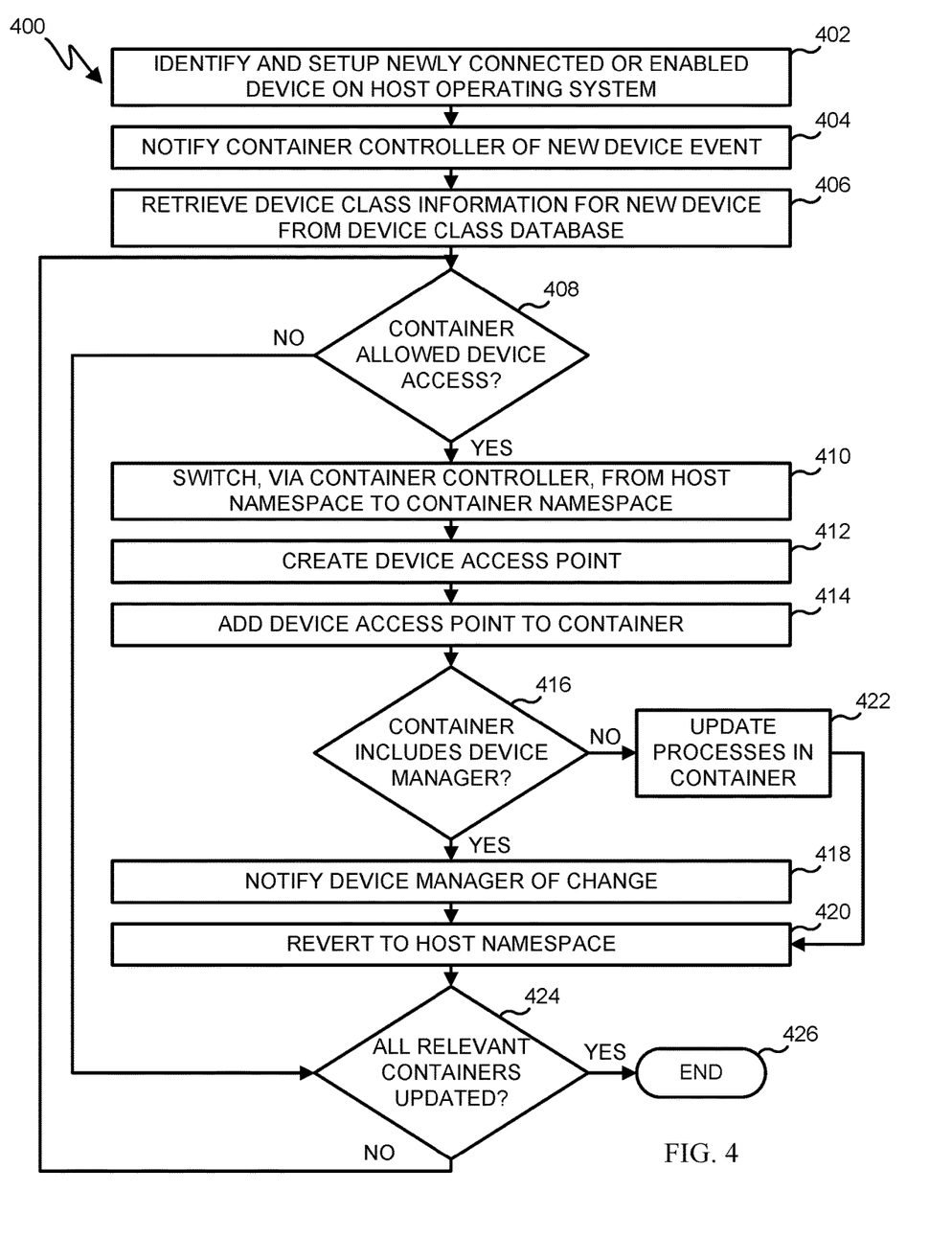
FIG. 4 illustrates a process for configuring device access for containers according to embodiments of this disclosure.

FIG. 4 illustrates a process 400 for configuring device access for containers according to embodiments of this disclosure. For ease of explanation, the process 400 is described as being executed or otherwise used by the processor 140 of the device 100 in FIG. 1. However, the process 400 may be used by any suitable device(s) and in any suitable system.

At block 402, the processor identifies and performs a setup or configuration, such as a PnP setup, of a newly connected, or newly enabled, device in the host operating system 202. At block 404, the processor notifies the container controller 212 of a new device event with respect to the new or enabled device. At block 406, the processor retrieves device class information for the device from the device class database 216, as well as at least one device ACL for the containers 206, if any. At decision block 408, the processor determines whether a container is allowed device access. The processor can also determine at decision block 408 which containers have priority over other containers based on the data or the ACL retrieved from the database 216, which is used by the processor to determine the order in which to update containers. In some embodiments, the processor determines the priority for each container, and then the processor, at decision block 408, determines for each container in the order of priority whether each container is allowed device access. If at decision block 408 the processor determines the container is not allowed device access, the process 400 moves to decision block 424. At decision block 424, the processor determines if all relevant containers are updated. If not, the process 400 loops back to decision block 408 to determine if a next container is allowed device access. If at decision block 424 the processor determines that all relevant containers are updated, the process 400 ends at block 426.

If at decision block 408 the processor determines that a container is allowed device access, the process 400 moves to block 410. At block 410, the processor, such as via the container controller 212, switches to the container namespace 208 for the particular container 206 to be updated, such as by using a namespace enter command for the particular container namespace 208. Once the processor enters the container namespace 208, the processor updates and/or reconfigures the container 206 from within the container namespace 208. At block 412, the processor creates at least one access point, such as a device node, for the device added to the system in block 402. At block 414, the processor mounts or adds the access point in the container 206. In some embodiments, access points can include device nodes linked to drivers in a kernel of the host operating system 202. Device nodes can be secured by discretionary access control (DAC) to prevent unauthorized access to the device nodes.

In some embodiments, when a storage device is enabled in the container, to prevent unauthorized access of containers processes to the entire storage device, the processor creates a specific shared directory that is mapped within the relevant containers. In some embodiments, changes made inside this directory are visible by both the host side and the container side. Certain permissions used by the host operating system to access the shared directory can be granted during container application initialization or launch time, or configured during run time by the processor in response to a device event, and these permissions are explicitly mapped inside the container. This allows for all the tasks inside the container to access/modify content of this special shared directory, while preventing access to the entire volume. The tasks inside the container are prevented from accessing files or directories in the volume, unless the tasks possess the relevant permissions, such as permissions allowing access to at least a portion of the shared directory. The shared directory provides a security guarantee from the host operating system that container processes cannot breach or circumvent normal operation of the host operating system.

At decision block 416, the processor determines if the container includes a device manager, such as a storage or volume manager or other type of device manager. If at decision block 416 the processor determines the container includes a device manager, at block 418 the processor notifies the device manager of the added device, signaling to the device manager to provide access to the access point for the container processes 210 in the container 206. The device manager can, in some embodiments, notify the processor when the container processes 210 have been updated to access the access point. The process 400 then moves to block 420. If, at decision block 416, the processor determines that the container 206 does not include a device manager, at block 422 the processor updates the container processes 210 of the device change. At block 420, the processor, such as via the container controller 212, reverts to the host namespace 204. The process 400 then moves to decision block 424. At decision block 424, the processor determines if all relevant containers are updated. If not, the process 400 loops back to decision block 408 to determine if a next container is allowed device access, and, if so, again performs blocks 410-424. If, at decision block 424, the processor determines that all relevant containers are updated, the process 400 ends at block 426.

Although FIG. 4 illustrates one example of a process 400 for configuring device access for containers according to embodiments of this disclosure, various changes may be made to FIG. 4. For example, while shown as a series of steps, various steps in FIG. 4 may overlap, occur in parallel, occur in a different order, or occur any number of times.

Figure 5:
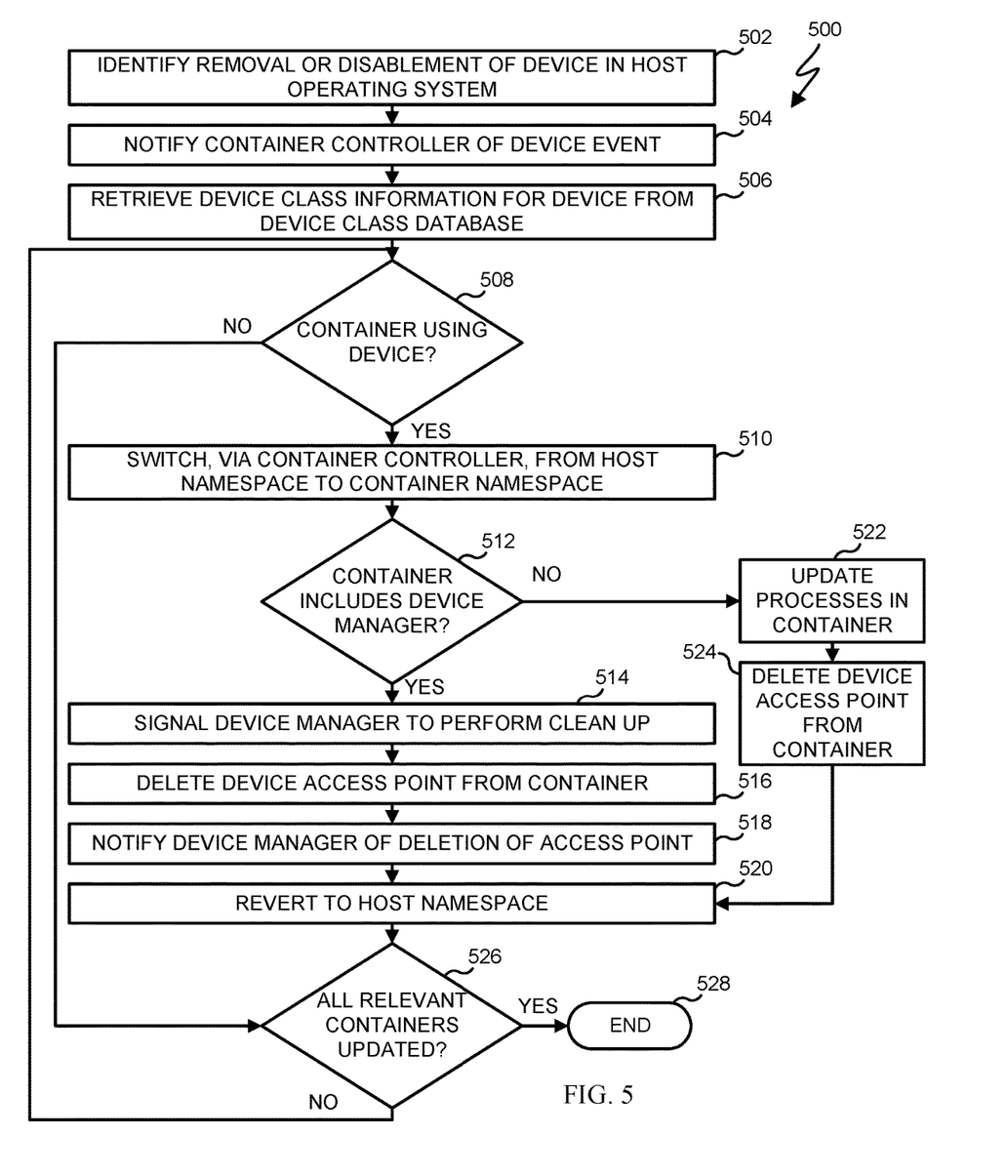
FIG. 5 illustrates a process for removing or disabling device access for containers according to embodiments of this disclosure.

FIG. 5 illustrates a process 500 for removing or disabling device access for containers according to embodiments of this disclosure. For ease of explanation, the process 500 is described as being executed or otherwise used by the processor 140 of the device 100 in FIG. 1. However, the process 500 may be used by any suitable device(s) and in any suitable system.

At block 502, the processor identifies a removal or disablement of a device in the host operating system 202. At block 504, the processor notifies the container controller 212 of a new device event with respect to the removal or disablement of the device. At block 506, the processor retrieves device class information for the device from the device class database 216, as well as at least one device ACL for the containers 206, if any. At decision block 508, the processor determines whether a container currently is configured to use the removed or disabled device. The processor can also determine at decision block 508 which containers have priority over other containers based on the data or the ACL retrieved from the database 216, which is used by the processor to determine the order in which to update containers. In some embodiments, the processor determines the priority for each container, and then the processor, at decision block 508, determines for each container in the order of priority whether each container is configured to use the device. In some embodiments, the processor can keep a record, such as in memory, in a file, or in the database 216, of which containers have previously been granted access for a device.

If, at decision block 508, the processor determines the container is not configured to use the device, the process 500 moves to decision block 526. At decision block 526, the processor determines if all relevant containers are updated. If not, the process 500 loops back to decision block 508 to determine if a next container is configured to use the device. If, at decision block 526, the processor determines that all relevant containers are updated, the process 500 ends at block 528.

If at decision block 508 the processor determines that a container is configured to use the removed or disabled device, the process 500 moves to block 510. At block 510, the processor, such as via the container controller 212, switches to the container namespace 208 for the particular container 206 to be updated, such as by using a namespace enter command for the particular container namespace 208. Once the processor enters the container namespace 208, the processor updates and/or reconfigures the container 206 from within the container namespace 208. At decision block 512, the processor determines if the container includes a device manager, such as a storage or volume manager or other type of device manager. If, at decision block 512, the processor determines the container includes a device manager, at block 514 the processor signals the device manager to perform cleanup operations. Device manager cleanup operations can include deallocating memory for devices, sending messages to applications currently using the devices to cease operations that use the device, or other operations. The device manager can, in some embodiments, notify the processor when cleanup operations are complete. The process 500 then moves to block 516. At block 516, the processor deletes or unmounts any access points associated with the removed or disabled device. At block 518, the processor notifies the device manager of the deletion of the access point. At block 520, the processor reverts to the host namespace 204. The process 500 then moves to decision block 526.

If, at decision block 512, the processor determines that the container 206 does not include a device manager, at block 522 the processor updates the container processes 210 of the device change, and the process 500 moves to block 524. At block 524, the processor deletes or unmounts any access points associated with the removed or disabled device. The process 500 then moves from block 524 to block 520. At block 520, the processor reverts to the host namespace 204 and moves to decision block 526. At decision block 526, the processor determines if all relevant containers are updated. If not, the process 500 loops back to decision block 508 to determine if a next container is configured to use the removed or disabled device, and, if so, again performs blocks 510-526. If, at decision block 526, the processor determines that all relevant containers are updated, the process 500 ends at block 528.

Although FIG. 5 illustrates one example of a process 500 for removing or disabling device access for containers according to embodiments of this disclosure, various changes may be made to FIG. 5. For example, while shown as a series of steps, various steps in FIG. 5 may overlap, occur in parallel, occur in a different order, or occur any number of times.

Although this disclosure has been described with an exemplary embodiment, various changes and modifications may be suggested to one skilled in the art. It is intended that this disclosure encompass such changes and modifications as fall within the scope of the appended claims.

What is claimed is:

1. An electronic device, comprising:
a memory; and
at least one processor coupled to the memory, wherein the at least one processor is configured to:
identify a device change event in a host operating system, wherein the device change event includes, at a runtime of one or more containers, enabling or disabling a device used by the host operating system, wherein the host operating system includes a host namespace;
switch, in response to the device change event, a container controller from the host namespace to a container namespace of a container of the one or more containers; and
update, using the container controller switched to the container namespace, the container with information based on the device change event;
wherein, to update the container, the at least one processor is configured to:
when the device change event includes enabling the device in the host operating system, create at least one device access point corresponding to the device and mount the at least one device access point to the container; and
when the device change event includes disabling the device in the host operating system, delete the at least one device access point corresponding to the device from the container.

2. The electronic device of claim 1, wherein, to update the container, the at least one processor is further configured to notify a container device manager in the container of the device change event.

3. The electronic device of claim 1, wherein, to update the container, the at least one processor is further configured to update one or more container processes in the container with the information based on the device change event.

4. The electronic device of claim 1, wherein the at least one processor is further configured to, upon updating the container, revert the container controller from the container namespace to the host namespace.

5. The electronic device of claim 1, wherein the at least one processor is further configured to:
retrieve device class information for the device from a device class database; and
determine, using an access control list (ACL), that the container is allowed access to the device based on the device class information.

6. The electronic device of claim 5, wherein the ACL includes a priority level for each of the one or more containers, and wherein, to update the container with the information based on the device change event, the at least one processor is further configured to update the one or more containers in an order of priority based on the priority level for each of the one or more containers.

7. The electronic device of claim 1, wherein the at least one device access point includes a device node that links to drivers in a kernel of the host operating system.

8. The electronic device of claim 7, wherein the device node is secured by discretionary access control (DAC) to prevent unauthorized access to the device node.

9. A method for dynamic device management, comprising:
identifying a device change event in a host operating system, wherein the device change event includes, at a runtime of one or more containers, enabling or disabling a device used by the host operating system, wherein the host operating system includes a host namespace;
switching, in response to the device change event, a container controller from the host namespace to a container namespace of a container of the one or more containers; and
updating, using the container controller switched to the container namespace, the container with information based on the device change event, wherein updating the container comprises:
when the device change event includes enabling the device in the host operating system, creating at least one device access point corresponding to the device and mounting the at least one device access point to the container, or
when the device change event includes disabling the device in the host operating system, deleting the at least one device access point corresponding to the device from the container.

10. The method of claim 9, wherein updating the container includes notifying a container device manager in the container of the device change event.

11. The method of claim 9, wherein updating the container includes updating one or more container processes in the container with the information based on the device change event.

12. The method of claim 9, further comprising, upon updating the container, reverting the container controller from the container namespace to the host namespace.

13. The method of claim 9, further comprising:
retrieving device class information for the device from a device class database; and
determining, using an access control list (ACL), that the container is allowed access to the device based on the device class information.

14. The method of claim 13, wherein the ACL includes a priority level for each of the one or more containers, and wherein updating the container with the information based on the device change event includes updating the one or more containers in an order of priority based on the priority level for each of the one or more containers.

15. The method of claim 9, wherein the at least one device access point includes a device node that links to drivers in a kernel of the host operating system.

16. The method of claim 15, wherein the device node is secured by discretionary access control (DAC) to prevent unauthorized access to the device node.

17. A non-transitory computer readable medium embodying a computer program for operating an electronic device including a memory and at least one processor, the computer program comprising computer readable instructions that, when executed by the at least one processor, cause the electronic device to:
identify a device change event in a host operating system, wherein the device change event includes, at a runtime of one or more containers, enabling or disabling a device used by the host operating system, wherein the host operating system includes a host namespace;
switch, in response to the device change event, a container controller from the host namespace to a container namespace of a container of the one or more containers; and
update, using the container controller switched to the container namespace, the container with information based on the device change event;
wherein the computer readable instructions that when executed cause the electronic device to update the container comprise computer readable instructions that when executed cause the electronic device to:
when the device change event includes enabling the device in the host operating system, create at least one device access point corresponding to the device and mount the at least one device access point to the container; and
when the device change event includes disabling the device in the host operating system, delete the at least one device access point corresponding to the device from the container.

18. The non-transitory computer readable medium of claim 17, wherein the computer program further comprises computer readable instructions that, when executed by the at least one processor, cause the electronic device to:
upon updating the container, revert the container controller from the container namespace to the host namespace.

19. The non-transitory computer readable medium of claim 17, wherein the at least one device access point includes a device node that links to drivers in a kernel of the host operating system.

20. The non-transitory computer readable medium of claim 19, wherein the device node is secured by discretionary access control (DAC) to prevent unauthorized access to the device node.

* * * * *